US010809918B2

(12) United States Patent
Martin et al.

(10) Patent No.: US 10,809,918 B2
(45) Date of Patent: Oct. 20, 2020

(54) CACHE PERFORMANCE ON A STORAGE SYSTEM

(71) Applicant: EMC IP Holding Company LLC, Hopkinton, MA (US)

(72) Inventors: Owen Martin, Hopedale, MA (US); Mark J. Halstead, Holliston, MA (US); William R. Smith-Vaniz, Sudbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 50 days.

(21) Appl. No.: 16/263,541

(22) Filed: Jan. 31, 2019

(65) Prior Publication Data

US 2020/0249838 A1    Aug. 6, 2020

(51) Int. Cl.
*G06F 12/00*    (2006.01)
*G06F 3/06*    (2006.01)
*G06F 17/18*    (2006.01)
*G06F 12/0875*    (2016.01)
*G06N 5/04*    (2006.01)

(52) U.S. Cl.
CPC ............ *G06F 3/061* (2013.01); *G06F 3/0631* (2013.01); *G06F 3/0683* (2013.01); *G06F 12/0875* (2013.01); *G06F 17/18* (2013.01); *G06N 5/04* (2013.01)

(58) Field of Classification Search
CPC ...... G06F 3/061; G06F 3/0631; G06F 3/0683; G06F 12/0802; G06F 12/0875; G06F 17/18; G06F 5/04
See application file for complete search history.

(56) References Cited

U.S. PATENT DOCUMENTS 6,715,039 B1 *    3/2004    Michael ................ G06F 12/121
                                                            711/130

OTHER PUBLICATIONS

Steven Chalmer, et al., "Data Deduplication Acceleration," U.S. Appl. No. 15/787,930, filed Oct. 19, 2017.

\* cited by examiner

*Primary Examiner* — Shawn X Gu
(74) *Attorney, Agent, or Firm* — Muirhead and Saturnelli, LLC

(57) ABSTRACT

Options for handling write operations may be selected based on a determined probability that a read operation for a portion of data will occur while the data portion is still in an I/O cache as a result of a write operation. As used herein, a "read-after-write event ("RAW")" is an occurrence of a read operation for a portion of data while the data portion is still in an I/O cache as a result of a write operation. The probability of a RAW may be determined by applying Bayesian inference, and may include applying exponential smoothing to calculations made on historical I/O information so that more recent I/O events have greater weight in determining RAW probability. Based on the determined RAW probability, write data may either be journaled in a write journal or written to a cache slot and de-staged to a physical storage device as part of write-in-place processing.

20 Claims, 12 Drawing Sheets

| Logical Device | Logical Device Track | Cache Pointer |
|---|---|---|
| 1 | 0 | J1 |
| 1 | 1 | J2 |
| 1 | 2 | J2 |
| 1 | 3 | |
| 1 | 4 | |
| 1 | 5 | |
| 1 | 6 | 1 |
| 1 | 7 | |
| 1 | 8 | |
| 1 | 9 | |
| 2 | 0 | 2 |
| 2 | 1 | |
| 2 | 2 | 3 |

FIG. 6

| Pd. | Read | Read EMA | Write | Write EMA | Read After Write | RAW EMA | Probability of receiving any I/O op | Probability that an I/O op will be a read | Probability an I/O op will be a RAW | Probability of RAW given I/O op is a read |
|---|---|---|---|---|---|---|---|---|---|---|
| 1 | 2,793 | 2,793 | 14,566 | 14,566 | 2,793 | 2,793 | 17% | 16% | 3% | 17.36% |
| 2 | 13,521 | 4,134 | 13,495 | 14,432 | 181 | 2467 | 19% | 22% | 2% | 11.08% |
| 3 | 2,085 | 3,878 | 12,830 | 14,232 | 133 | 2175 | 18% | 21% | 2% | 10.16% |
| 4 | 2,487 | 3,704 | 13,713 | 14,167 | 179 | 1925 | 18% | 21% | 2% | 9.29% |
| 5 | 2,889 | 3,602 | 14,810 | 14,247 | 214 | 1711 | 18% | 20% | 2% | 8.48% |
| 6 | 2,884 | 3,512 | 13,083 | 14,102 | 227 | 1526 | 18% | 20% | 2% | 7.65% |
| 7 | 2,558 | 3,393 | 5,523 | 13,029 | 200 | 1360 | 16% | 21% | 1% | 6.58% |
| 8 | 2,056 | 3,226 | 15,422 | 13,329 | 216 | 1217 | 17% | 19% | 1% | 6.25% |
| 9 | 3,288 | 3,234 | 13,879 | 13,397 | 225 | 1093 | 17% | 19% | 1% | 5.62% |
| 10 | 2,058 | 3,087 | 13,843 | 13,453 | 170 | 978 | 17% | 19% | 1% | 5.24% |
| 11 | 3,000 | 3,076 | 15,026 | 13,650 | 250 | 887 | 17% | 18% | 1% | 4.82% |
| 12 | 3,335 | 3,108 | 14,677 | 13,778 | 218 | 803 | 17% | 18% | 1% | 4.36% |
| 13 | 2,346 | 3,013 | 14,283 | 13,841 | 228 | 731 | 17% | 18% | 1% | 4.09% |
| 14 | 2,821 | 2,989 | 14,551 | 13,930 | 248 | 671 | 17% | 18% | 1% | 3.80% |
| 15 | 2,520 | 2,930 | 14,858 | 14,046 | 289 | 623 | 17% | 17% | 1% | 3.61% |
| 16 | 2,151 | 2,833 | 16,118 | 14,305 | 261 | 578 | 17% | 17% | 1% | 3.50% |
| 17 | 15,774 | 4,451 | 14,967 | 14,388 | 237 | 535 | 19% | 24% | 1% | 2.27% |
| 18 | 4,200 | 4,419 | 15,200 | 14,489 | 177 | 490 | 19% | 23% | 0% | 2.10% |
| 19 | 2,657 | 4,199 | 14,908 | 14,542 | 270 | 463 | 19% | 22% | 0% | 2.07% |
| 20 | 55,137 | 10,566 | 18,362 | 15,019 | 44444 | 5961 | 26% | 41% | 6% | 14.43% |
| 21 | 2,459 | 9,553 | 16,042 | 15,147 | 214 | 5242 | 25% | 39% | 5% | 13.55% |
| 22 | 2,563 | 8,679 | 15,566 | 15,199 | 213 | 4614 | 24% | 36% | 5% | 12.69% |
| 23 | 3,332 | 8,011 | 15,524 | 15,240 | 221 | 4065 | 23% | 34% | 4% | 11.80% |
| 24 | 2,186 | 7,283 | 14,814 | 15,187 | 238 | 3586 | 22% | 32% | 4% | 11.06% |
| 25 | 1,672 | 6,581 | 14,041 | 15,043 | 149 | 3157 | 22% | 30% | 3% | 10.37% |
| 26 | 2,577 | 6,081 | 15,463 | 15,096 | 251 | 2793 | 21% | 29% | 3% | 9.73% |
| 27 | 2,794 | 5,670 | 15,166 | 15,105 | 239 | 2474 | 21% | 27% | 2% | 9.06% |
| 28 | 2,363 | 5,257 | 18,186 | 15,490 | 273 | 2199 | 21% | 25% | 2% | 8.68% |
| 29 | 3,556 | 5,044 | 15,814 | 15,530 | 223 | 1952 | 21% | 25% | 2% | 7.96% |
| 30 | 3,785 | 4,887 | 16,710 | 15,678 | 285 | 1744 | 21% | 24% | 2% | 7.34% |
| 31 | 2,337 | 4,568 | 15,252 | 15,625 | 207 | 1551 | 20% | 23% | 2% | 6.86% |
| 32 | 2,822 | 4,350 | 15,653 | 15,628 | 218 | 1385 | 20% | 22% | 2% | 6.36% |
| 33 | 15,632 | 5,760 | 15,010 | 15,551 | 266 | 1245 | 21% | 27% | 1% | 4.61% |
| 34 | 2,430 | 5,344 | 15,551 | 15,551 | 223 | 1117 | 21% | 26% | 1% | 4.37% |

FIG. 10

CACHE PERFORMANCE ON A STORAGE SYSTEM

BACKGROUND

Technical Field

This application generally relates to data storage and, in particular, cache performance on a data storage system.

Description of Related Art

Data storage systems may include resources used by one or more host systems (i.e., "hosts"). Data storage systems and host systems may be interconnected by one or more communication connections such as in a network. These resources may include, for example, data storage devices such as those included in the data storage systems manufactured by EMC Corporation of Hopkinton Mass. ("Dell EMC"). These data storage systems may be coupled to one or more host systems, where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system. Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform I/O operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems also may be used.

A host system may host applications that utilize storage devices of the storage system. For a given application, to perform I/O operations utilizing a storage device of the storage system, one or more components of each of: a host; a switch; and a storage system may be used; i.e., communications for performing I/O operations may be transmitted through these one or more components. The one or more combinations of components of the host, switch and storage system over which I/O operations between an application and storage device can be communicated may be considered an I/O path between the application and the storage device. These I/O paths define a connectivity of the storage network.

SUMMARY OF THE INVENTION

In some embodiments of the invention, I/O cache is managed on a storage system, including: for at least a first storage device of the storage system, determining a probability that a read operation for a portion of data will be received while the portion of data resides in the I/O cache as a result of a write operation for the portion of data, receiving a write request for the at least first storage device, the write request specifying a write operation for a first portion of data and an address range within the at least first storage device, and determining based at least in part on the probability whether to: to record a journal entry for the first portion of data in a journal, or perform normal cache processing. Determining the probability may include applying exponential smoothing to historical read and write information so that more recent historical read and write information has greater weight in determining the probability. Determining based at least in part on the probability may include: comparing the probability to a predefined probability threshold, if the probability is less than or equal to the predefined probability threshold, determining to record the journal entry, if the probability is greater than the predefined probability threshold, determining to perform the normal cache processing. Managing the I/O cache may include, if it is determined to record the journal entry, applying a hash function to the address range to produce a hash value, where the journal corresponds to the hash value. Managing the I/O cache may include: storing the hash value in an entry of the hash table, the entry specifying a reference to the journal, receiving a read request specifying a read operation for an address range of a storage device, and determining that either: there is not a journal entry for the address range in a journal; or there may be a journal entry for the second data in a journal. Managing the I/O cache may include, if it determined that there may be a journal entry for the address range, playing back a journal to determine if there is a journal entry.

In some embodiments, a storage system includes an I/O cache, at least a first storage device, one or more processors; and memory including code stored thereon that, when executed, performs the above described method.

In some embodiments, one or more computer-readable media, for example, non-transitory computer-readable media, are provided having software stored thereon for managing an I/O cache of a storage system, the software including executable code that performs the above-described method.

BRIEF DESCRIPTION OF THE DRAWINGS

Features and advantages of the present invention will become more apparent from the following detailed description of illustrative embodiments thereof taken in conjunction with the accompanying drawings in which:

FIG. 6 is a block diagram illustrating an example of a data structure for mapping logical device tracks to cache slots, according to embodiments of the invention;

FIG. 10 is a table illustrating examples of probabilities of read-after-write events determined from read, write and read-after-write counts, according to embodiments of the invention.

DETAILED DESCRIPTION OF EMBODIMENTS

Figure 1:
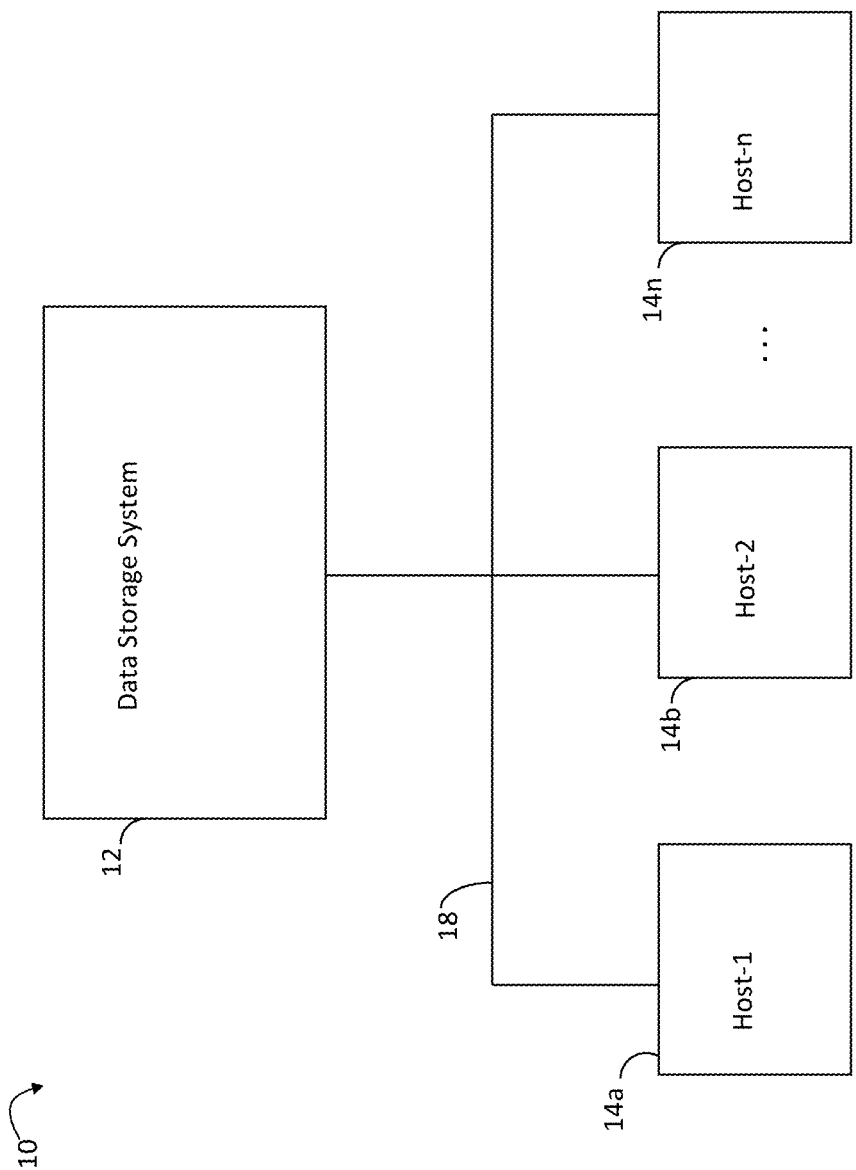
FIG. 1 is a block diagram illustrating an example of a system according to embodiments of the invention.

Write operations can impact I/O performance on a storage system due to the common constraints of recovery time objective (RTO) and recover point objective (RPO). One way to address such I/O performance impact is to write in place using a blocking lock, in which write data is written to cache (e.g., by a CPU of a director), and other CPUs are blocked from writing to the same address until the write operation completes. Writing in place with blocking has the benefit of providing easy lookup when data is read; e.g., it may be read directly from a cache slot. However, the blocking operation can limit parallelism, and relatively large amounts of metadata may be required to describe the changed storage blocks. Further, there is potential space inefficiency when the data being written is less than a fixed slot size of the cache. For example, the cache may include cache slots that are of a fixed size of 128K. A write operation may be for a portion of data less than 128K (e.g., a multiple of 8K) in size, but a whole 128K slot is used.

Another way to address I/O performance impact caused by RTO and RPO constraints is a write journal, which may allow for fast and efficient use of cache, but with a performance penalty tradeoff on reads. That is, while a write journal may consume less space per write than writing in place using a blocking lock, a read operation may require playing back a whole write journal to locate a last write operation corresponding to the physical storage device location (e.g., address range) of the read operation.

What is desired is a technique for processing write operations that improves cache performance, for example, in light of RTO and RPO constraints, while reducing the impact of the foregoing potential drawbacks.

Described herein is a system and techniques that select between options for handling write operations based on a determined probability that a read operation for a portion of data will occur while the data portion is still in an I/O cache as a result of a write operation. As used herein, a "read-after-write event" or an "RAW" is an occurrence of a read operation for a portion of data while the data portion is still in an I/O cache as a result of a write operation. The probability of a RAW may be determined by applying Bayesian inference as described in more detail elsewhere herein, and may include applying exponential smoothing to calculations made on historical I/O (e.g., read and write) information so that more recent I/O events have greater weight in determining RAW probability. Based at least in part on the determined RAW probability, write data may either be journaled in a write journal (buffer) or written to a cache slot as part of write-in-place processing (i.e., normal cache processing).

To record a write operation in a write journal, a hash function may be applied to the address range (of a physical storage device) specified by the write operation to produce a hash value corresponding to an entry of a hash table. The entry of the hash table may reference a write journal corresponding to the hash value of the entry, and the write operation (including, e.g., storage device ID, starting logical bock address (LBA) and LBA offset) may be recorded in the journal. The hash table may be part of a Bloom filter (or the like) used to determine if an address range specified by a read operation is contained in one or more write operations stored in one or more write journals referenced by the hash table. That is, when a read operation is received, it may be determined if a write journal exists. As is explained in more detail elsewhere herein, even if journaling is not active, there still may be one or more write journals previously created when journaling was active that have not yet been de-staged to disk. If it is determined that one or more write journals exist, the address range of the read operation may be hashed to produce a hash value, and it may be determined whether there is any entry in the hash table having a matching hash value. If there is no match, it may be concluded that there is no journal entry containing the same storage device address range. If there is a match, it may be concluded that there may be a journal entry containing the address range. However, because multiple address ranges may produce the same hash value, the journal corresponding to the hash entry of the hash table may be played back in its entirety to determine if any of the journal entries therein contain the address range. In some embodiments, multiple writes are allowed to a same address range in a journal before it is de-staged. It should be noted that during playback in such embodiments, even if an entry is found in the journal that contains the address range of the read operation, the remainder of the journal is still played back.

It should be appreciated that, rather than having one master write journal for a storage device or for a storage system, multiple write journals (one for each hash table entry) may be employed, have a smaller size than a single master write journal, and as such may be referred to herein as "compact journals." A benefit to the smaller size of such compact journals is that it takes less time and storage system resources to playback the journal than if one master journal were used.

In some embodiments, one or more compact journals may be implemented using a portion of cache memory; i.e., a portion of cache (e.g., some number of cache slots) may be reserved for compact journals. Each entry in a compact journal may consume only an amount of memory space corresponding to a size of the data portion specified by the write operation of the entry. This may provide a memory space savings, perhaps a substantial space saving, over writing to cache as part of writing in place (i.e., as part of normal cache processing) in which each write operation may have to consume an entire cache slot, regardless of a size of the payload of the write operation. For example, a storage system may be configured to have a fixed uniform cache slot size, e.g., 128K, and may be configured to handle a minimum I/O payload size of 8 KB. In such a system, for a write operation having a payload of 8 KB, 120 KB of cache slot space may be wasted when the write operation is cached in a 128 KB-slot as part of normal cache processing. One the other hand, in embodiments of the invention, only 8 KB (or perhaps a little more for overhead) is consumed by a journal entry for a write operation having an 8 KB payload. Thus, substantial space savings may be realized using compact journals—i.e., write operations may be more densely packed into a cache. The saved cache space may be used to provide more cache space for normal cache processing (e.g., if journaling is being used by some but not all storage devices) and for other purposes.

Even though substantial space savings may be realized using compact journals, if a read operation is for an address range that is in a compact journal, the compact journal may be played back to retrieve the data for the address range. Further, even if the address range of a read operation is not in a compact journal, if the address range hashes to a same hash value (of a hash table entry) as an address range having a journal entry, the journal corresponding to the hash table entry will have to be played back. The time and resources consumed in playing back journal entries may offset and even outweigh the benefit of space savings.

In some embodiments of the invention, a RAW probability threshold ("RAW threshold") may be defined to optimize the benefits of normal caching and using compact journals; i.e., to find a desirable balance between the pros and cons of normal caching vs. using compact journals, including those described herein. The determined RAW probability may be compared to the RAW threshold to determine whether to use compact journals, or instead perform normal cache processing. For example, if the determined RAW probability is below or equal to the RAW threshold, compact journaling may be activated (e.g., by setting a flag or signal) or remain active, and if the determined RAW probability is above the RAW threshold, compact journaling may be de-activated (e.g., by clearing a flag or signal) or remain inactive and normal caching employed. All else being equal, the greater the RAW threshold, the greater the likelihood of saving cache space by using compact journals and the more likely that an active compact journal will be played back; and the lower the RAW threshold, the lower the likelihood of saving cache space by compact journals and the less likely that an active compact journal will be played back.

In some embodiments, a compact journal may be de-staged (i.e., flushed or committed to disk—the data contents written to one or more physical storage devices, which may be a solid state device (SSD) as opposed to a disk) when the compact journal is determined to be full, or as part of the normal cache de-staging procedure, and may be evicted from cache or as part of normal LRU (least recently used) eviction of a cache. That is, if a compact journal is the LRU among cache slots of the cache, the compact journal may be evicted. In some embodiments, a compact journal may be de-staged when journaling is deactivated, for example, in response to the determined RAW probability being greater than a RAW threshold or in response to user input, and/or may be de-staged in accordance with a normal cache de-staging process.

The amount (e.g., percentage) of cache reserved for compact journals may be selected based on a variety of factors, and the balancing of same, including but not limited to: storage capacity of the storage device (and/or individual storage devices); a total amount of cache space available; a desired read hit rate in the normal cache slots (the greater, the better), a desired eviction rate (e.g., fall-through time) of the cache (the lower the better); a desired read hit rate for the compact journals (the lower, the better); a desired amount of storage address space to be covered by each compact journal; a size of each compact journal (e.g., 32 MB) vs. the desired amount of storage address space covered (e.g., 1 GB); the number of entries in a hash table of a Bloom filter and thus the number of compact journals; other factors; or any suitable combination of the foregoing. For example, based on one or more of the foregoing factors, 20%-30% of cache may be reserved for compact journals. Other percentages of cache may be used.

Any of a variety of hash functions may be used to generated hash values of address ranges (e.g., MD5, SHA-1, etc.), for example, a hash function that produces a uniformly random distribution of hash values as output. In some embodiments, a hash function may be selected so that all address ranges within a contiguous address space (e.g., a track of a physical storage device or a portion thereof) are hashed to a same hash value. In such embodiments, each hash entry in the hash table, and each compact journal linked to the entry, correspond to a contiguous address space.

Illustrative embodiments of the invention will now be described in more detail in relation to the figures.

Referring now to FIG. 1, shown is an example of an embodiment of a system 10 according to some embodiments of the invention. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and also may communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be appreciated that the particulars of the hardware and software included in each of the components that may be included in the data storage system 12 are described herein in more detail, and may vary with each particular embodiment. Each of the host computers 14a-14n and data storage system may all be located at the same physical site, or, alternatively, also may be located in different physical locations. Communication media that may be used to provide the different types of connections between the host computer systems and the data storage system of the system 10 may use a variety of different communication protocols such as, for example, SCSI, ESCON, Fibre Channel, iSCSI, FCoE, GIGE (Gigabit Ethernet), NVMeoF (NVMe over Fabric) and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2B:
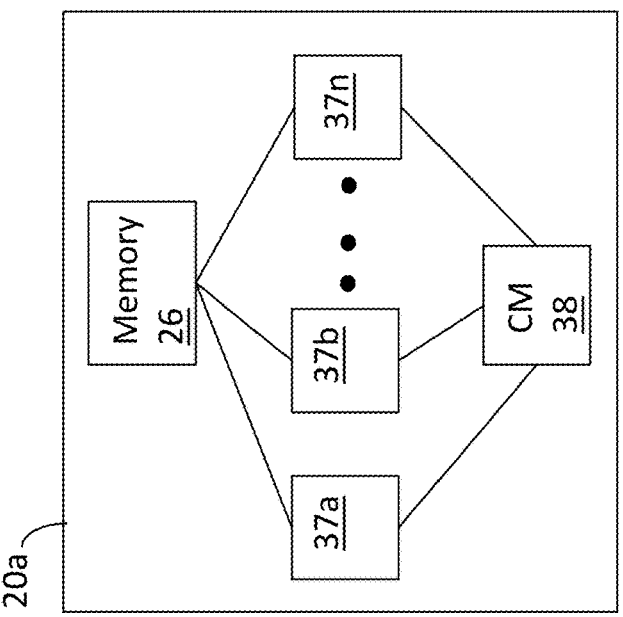
FIG. 2B is a block diagram illustrating an example of logical internal communications between directors and memory of the data storage system of FIG. 2A according to embodiments of the invention.
Figure 2A:
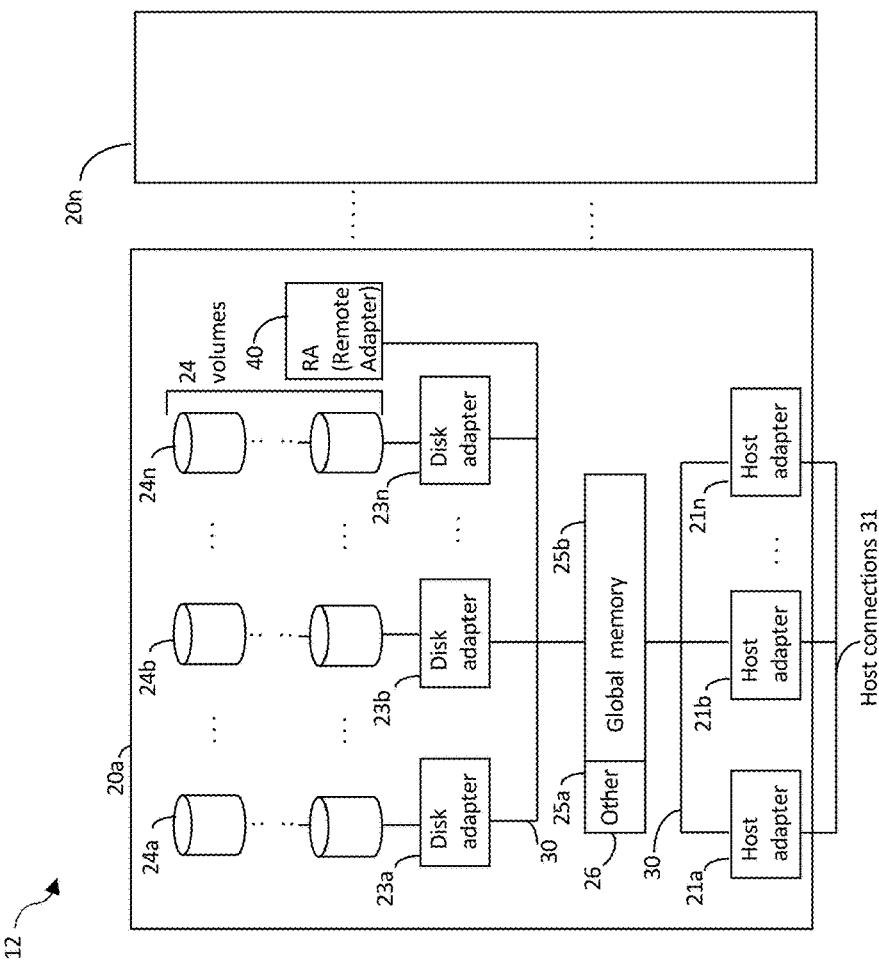
FIG. 2A is a block diagram illustrating an example of a data storage system according to embodiments of the invention.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example, as described in more detail in following paragraphs, reference is made to the more detailed view of element 20a. It should be noted that a similar more detailed description also may apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of physical data storage devices (e.g., physical non-volatile storage devices), such as disk devices, solid-state storage devices (SSDs, e.g., flash) or volumes, for example, in an arrangement 24 consisting of n rows of physical storage devices 24a-24n. In this arrangement, each row of physical storage devices may be connected to a disk adapter ("DA") or director responsible for the backend management of operations to and from a portion of the physical storage devices 24. A DA also may be referred to herein a back-end adapter ("BE"). In the system 20a, a single DA, such as 23a, may be responsible for the management of a row of physical storage devices, such as row 24a. System 20a also may include a fabric that enables any of disk adapters 23a-23n to access any of physical storage devices 24-24N, in which one or more technologies and/or protocols (e.g., NVMe or NVMe-oF) may be employed to communicate and transfer data between the DAs and the disks or volumes. The system 20a also may include one or more host adapters ("HAs") or directors 21a-21n. Each of these HAs may be used to manage communications and data operations between one or more host systems and the global memory. In an embodiment, the HA may be a Fibre Channel Adapter or other type of adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting physical storage devices may be any suitable physical storage device such as a rotating disk drive, flash-based storage, and the like. The particular data storage system as described in this embodiment, or a particular physical storage device thereof, such as a rotating disk or solid-state storage device (SSD; e.g., a flash-based storage device), should not be construed as a limitation. Other types of commercially available data storage systems, as well as processors and hardware controlling access to these particular devices, also may be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be de-staged from cache to the physical storage device, such as by a DA.

Host systems provide data and access control information through channels to the storage systems, and the storage systems also may provide data to the host systems also through the channels. The host systems do not address the disk drives of the storage systems directly, but rather access to data may be provided to one or more host systems from what the host systems view as a plurality of LUNs. The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Referring to FIG. 2B, shown is a representation of the logical internal communications between the directors and memory included in a data storage system according to some embodiments of the invention. Included in FIG. 2B is a plurality of directors 37a-37n coupled to the memory 26. Each of the directors 37a-37n represents one of the HAs, RAs, or DAs that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host also may have one or more additional mapping layers so that, for example, a host side logical device or volume is mapped to one or more data storage system logical devices as presented to the host. The unqualified term "storage device" as used herein means a logical device or physical storage device.

Storage system 12 or one or more components thereof described in relation to FIGS. 1-2B may be implemented using one or more Symmetrix®, VMAX® or VMAX3® systems (hereinafter referred to generally as VMAX storage systems) made available from Dell EMC.

Figure 3:
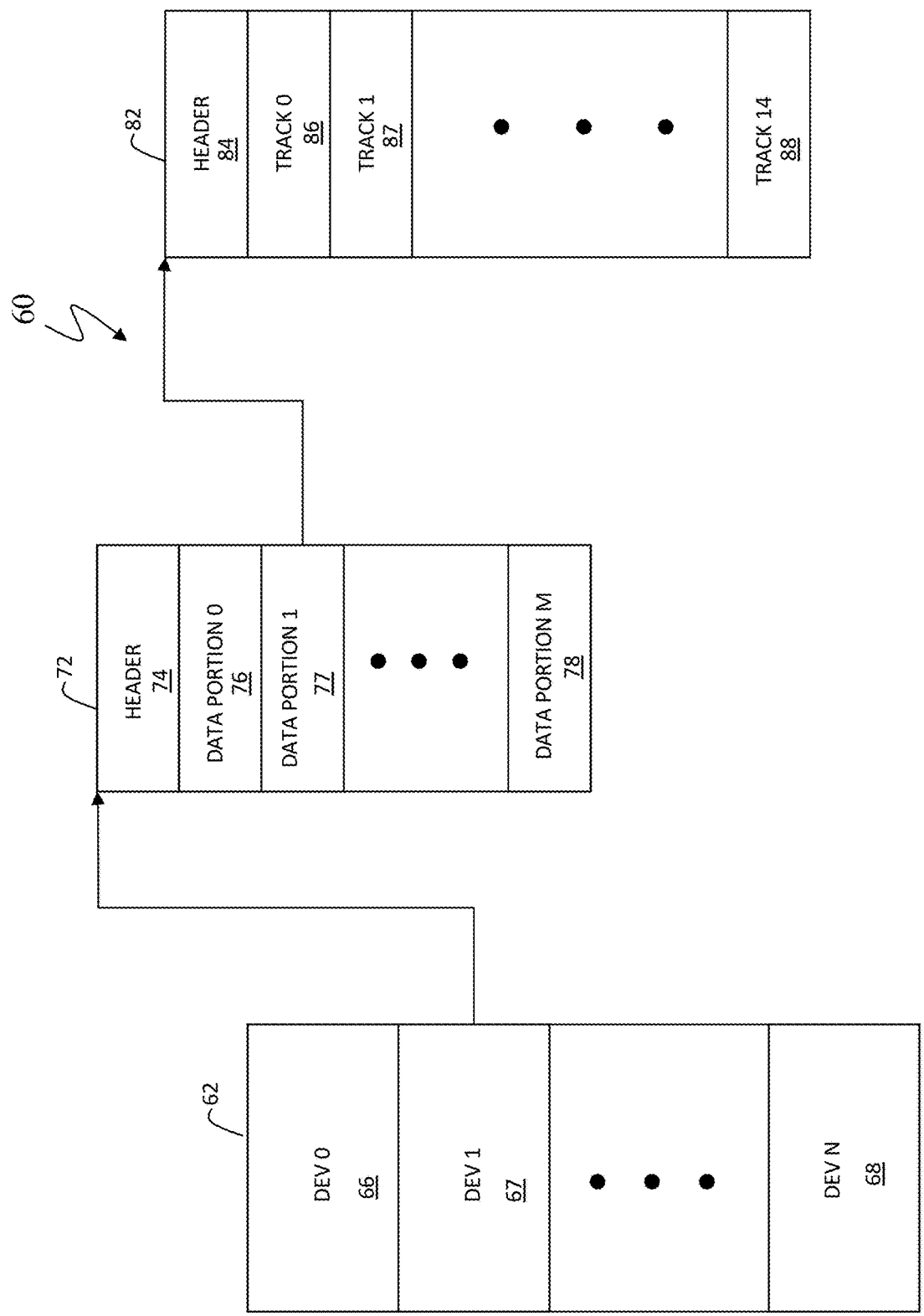
FIG. 3 is a block diagram illustrating an example of tables for keeping track of logical information associated with storage devices, according to embodiments of the invention.

FIG. 3 is a block diagram illustrating an example of tables 60 for keeping track of logical information associated with storage devices, according to embodiments of the invention. A first table 62 corresponds to all of the logical devices used by the storage system 24 or by an element of a storage system, such as an HA and/or a DA. The table 62 may include a plurality of logical device entries 66-68 that correspond to the logical devices used by the data storage system 24. The entries in the table 62 may include descriptions for standard logical devices, virtual devices, log devices, thin devices, and other types of logical devices.

Each of the entries 66-68 of the table 62 may correspond to another table that contains information for each of the logical devices. For example, the entry 67 may correspond to a table 72. The table 72 may include a header that contains overhead information. The table 72 also may include entries 76-78 for separate contiguous data portions of the logical device (e.g., a cylinder and/or a group of tracks). In an embodiment disclosed herein, a logical device may contain any number of data portions depending upon how the logical device is initialized. However, in other embodiments, a logical device may contain a fixed number of data portions.

Each of the data portion entries 76-78 may correspond to a track table. For example, the entry 77 may correspond to a track table 82 that includes a header 84 having overhead information. The track table 82 also includes entries 86-88 for each of the tracks. In an embodiment disclosed herein, there are fifteen tracks for every contiguous data portion. However, for other embodiments, it may be possible to have different numbers of tracks for each of the data portions or even a variable number of tracks for each data portion. The information in each of the entries 86-88 may include a pointer (either direct or indirect) to a physical address of a physical storage device, for example, any of physical storage devices 24a-24n of the storage system 20a (or a remote storage system if the system is so configured). Thus, the track table 82 may be used to map logical addresses of the logical device corresponding to the tables 62, 72, 82 to physical addresses within physical storage devices of a storage system.

The tables 62, 72, 82 of FIG. 3 may be stored in the global memory 26 of the storage system 24 during operation thereof and may otherwise be stored in non-volatile memory (i.e., with the corresponding physical device). In addition, tables corresponding to logical devices accessed by a particular host may be stored in local memory of the corresponding one of the HA's 28a-28c. In addition, the RA's 32a-32c and/or the DA's 38a-38c may also use and locally store portions of the tables 62, 72, 82.

Figure 4:
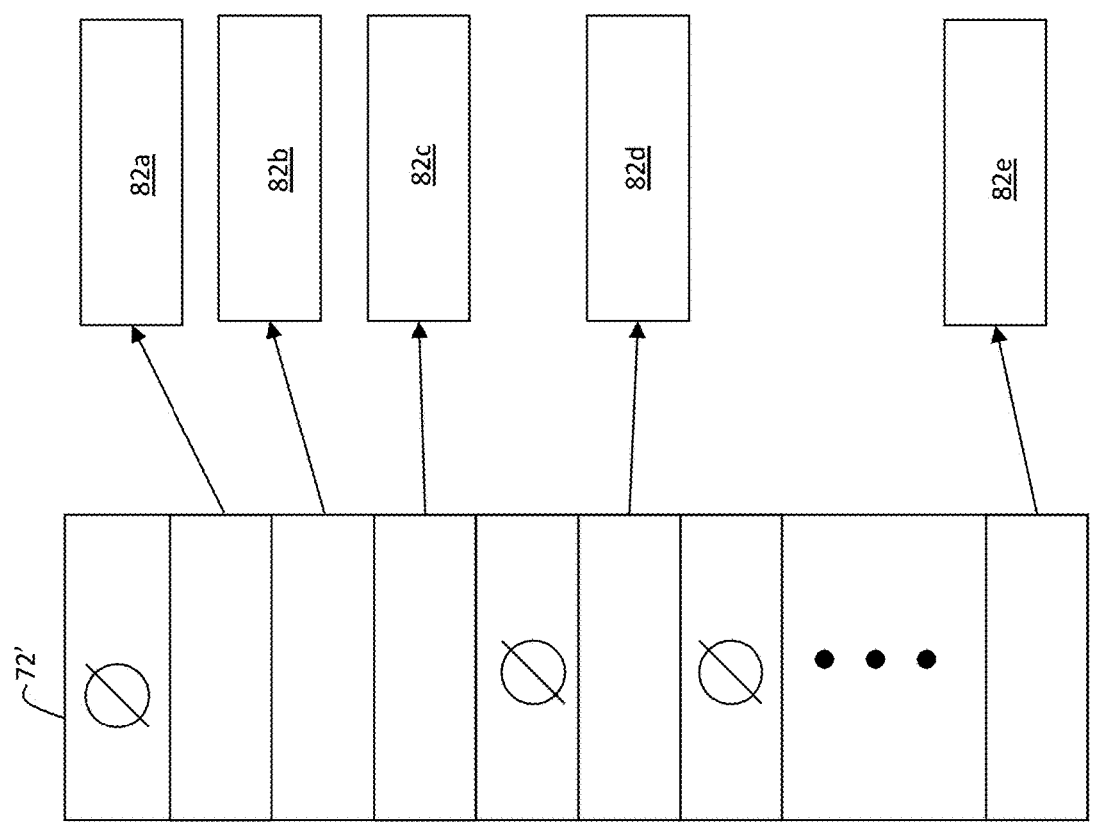
FIG. 4 is a block diagram illustrating an example of a table used for a thin logical device, according to embodiments of the invention.

FIG. 4 is a diagram illustrating an example of a table 72' used for a thin logical device, according to embodiments of the invention, which may include null pointers as well as entries similar to entries for the table 72, discussed above, that point to a plurality of track tables 82a-82e. The thin logical device may be allocated by the system to show a particular storage capacity while having a smaller amount of physical storage that is actually allocated. When a thin logical device is initialized, all (or at least most) of the entries in the table 72' may be set to null. Physical data may be allocated for particular sections as data is written to the particular data portion. If no data is written to a data portion, the corresponding entry in the table 72' for the data portion maintains the null pointer that was written at initialization.

Figure 5:
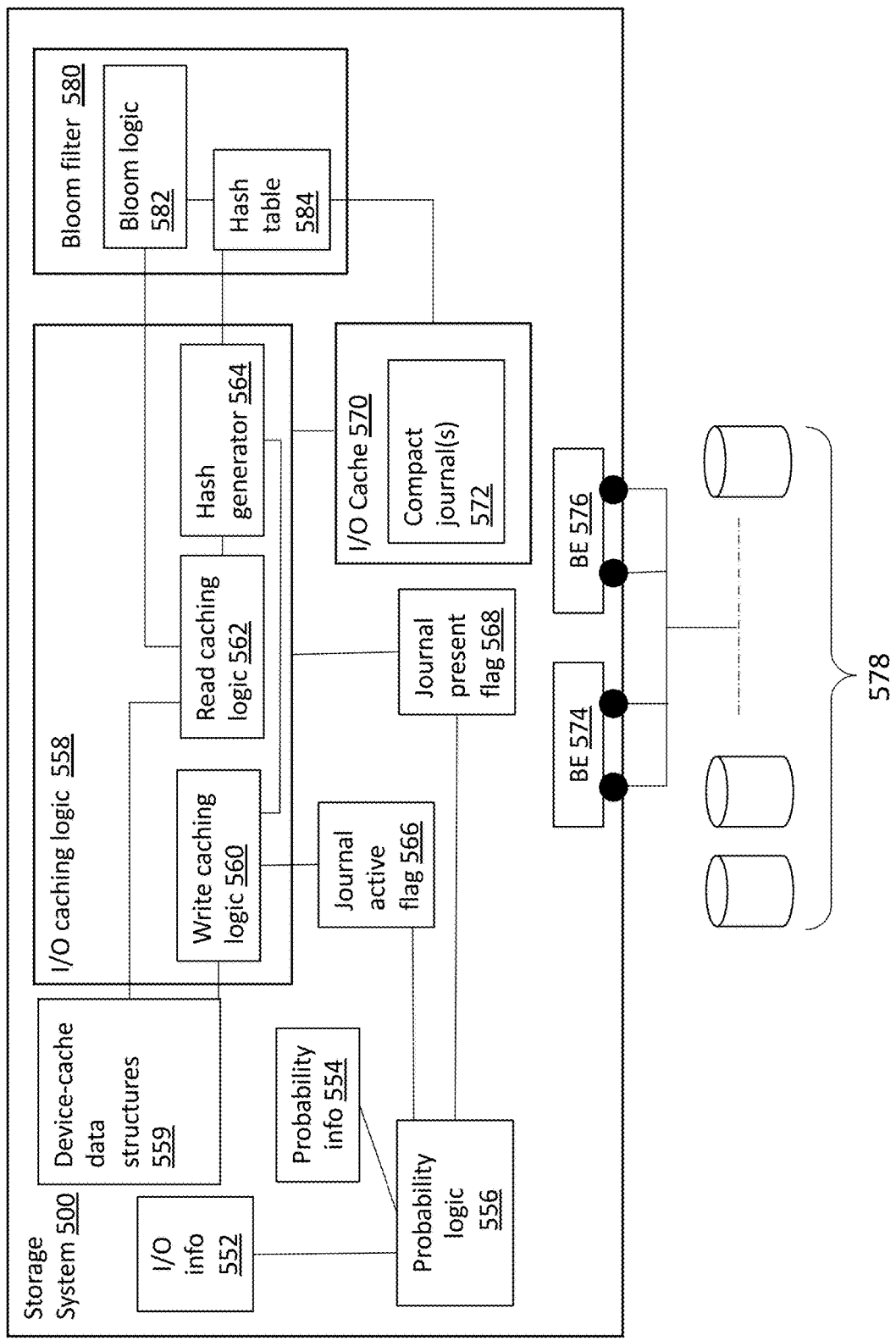
FIG. 5 is a block diagram illustrating an example of a storage system for processing I/O operations based at least in part on a probability of a read-after-write event, according to embodiments of the invention.

FIG. 5 is a block diagram illustrating an example of a storage system 500 for processing I/O operations based at least in part on a probability of a read-after-write event, according to embodiments of the invention. Other embodiments of system for processing I/O operations based at least in part on a probability of a read-after-write event, for example, variations of system 500, are possible and are intended to fall within the scope of the invention. Storage system 500 may be implemented as part of, or include, a storage system 12 and/or 20a, or include any of the components thereof described herein.

Storage system 500 may include any of: I/O information 552; probability information 554; probability logic 556; device-cache data structures 557; I/O caching logic 558; Bloom filter 580, I/O cache 570; and one or more back-end adapters (BEs) for storage devices, BE 574, 576, each including one or more ports connected to physical storage devices 578. I/O data 552 may include historical I/O information for one or more storage devices of the storage system, including any of: reads per unit time (e.g., seconds, minutes, hours); writes per unit time, RAWs per unit time; other I/O information or any suitable combination of the foregoing. Probability data 554 may include user-defined values such as, for example, a RAW threshold, and probability information determined from I/O data 552 and/or other information, including previously calculated RAW probabilities and RAW probabilities for current I/O operations.

Probability logic 556 may be configured to determine probability data 554 from I/O data 552, for example, as described in more details elsewhere herein. For example, probability logic may be configured to compare a determined RAW probability to a RAW threshold, and to set or clear a journal active flag 566 accordingly, as described in more detail elsewhere herein. In some embodiments, the probability logic 556 may be configured to control a de-staging of compact journals to disk if it is determined that the RAW probability is less than a RAW threshold, and then clear the journal present flag 568. In some embodiments, in addition, or as an alternative, to compact journals being flushed for the foregoing reasons, compact journals may be de-staged to disk as a result of the cache de-staging process, and the journal present flag 568 cleared as a result.

I/O caching logic 558 may be configured to perform I/O cache processing (including, for example, controlling use of Bloom filter 580 and compact journal(s) 572) in accordance with embodiments of the invention. I/O caching logic 560 may include any of: write caching logic 560; read caching logic 562; hash generator 564; other components; or any suitable combination of the foregoing. Write caching logic 560 and read caching logic 562 may be configured to perform write cache processing and read cache processing accordingly to embodiments of the invention described herein. I/O caching logic 558 may be configured to use one or more device-cache data structures 559 to assist in managing I/O cache 570. For example, device-cache data structures 559 may define a current mapping between logical storage devices, including thin devices, and cache slots of cache 570, and may be implemented using data structure 600 described in more detail in relation to FIG. 6.

Hash generator 564 may be configured to apply a hash function (e.g., MD5, SHA-1, etc.) to I/O address ranges to produce hash values to be stored in, and/or compared to entries in, hash table 584 as part of a read or write operation, as described in more detail elsewhere herein.

In some embodiments of the invention, a Bloom filter (e.g., Bloom filter 580) may be used. A Bloom filter is known in the art and may be characterized as a space-efficient probabilistic data structure that may be used to test whether an element is a member of a set. False positive matches are possible, but false negatives are not. In other words, a query returns either "possibly or may be in set" or "definitely not in set". The more elements that are added to the set, the larger the probability of false positives. Bloom filters may apply multiple hash functions to an input element to determine whether the element is a member of a set. In embodiments described herein, only a single hash function is used, but is should be appreciated that more than one hah function may be used is some embodiments to determine membership.

Bloom filter 580 may include Bloom logic 582, which may be configured to determine whether an address range of a read operation: is not contained within an address range currently in a compact journal; or may be contained within an address range currently in a compact journal, as described in more detail elsewhere herein. Bloom logic 582 may be configured to receive a hash value generated by hash generator 564 for an address range of a read operation, and compare the hash value to one or more entries in hash table 584, each entry having a hash value generated from an address range of a write operation. The Bloom logic 582 may return a value to read caching logic 562 indicating whether there was a matching hash value in the hash table 584, a matching hash value indicating that the address range of the read operation may be contained within an address range currently in a compact journal, and a non-matching hash value indicating that there is not currently an address range currently in any compact journal that contains the address range of the read operation.

I/O cache 570 may be memory used to cache I/O data, and may be included, for example, as part of a global memory (e.g., 25b) of the storage system 500. Write data received at the storage system from a host or other client may be initially written to I/O cache 570 and marked as write pending. Once write data has been written to cache, the storage system 500 may notify the host that the write operation has completed. At a later point time, the write data may be de-staged from cache to the physical storage device, such as by one of BEs 574, 576. I/O cache 570 may be partitioned into a plurality of sections of uniform size (e.g., 128K) referred to herein as "cache slots," where each cache slot (used for normal caching) holds the write data for a single write operation The slot size may be based on a physical parameter of the physical storage devices 578 of the storage system 500. For example, one or more physical storage devices 578 may be partitioned into one or more uniform units called tracks, which may be, for example, defined to have a uniform size of 128K. The storage system 500 may be configured to recognize that the one or more physical storage devices 578 are portioned into a uniform size of 128K.

The storage system 500 may be configured to handle a minimum I/O payload size, for example, 8 KB, which is smaller than the cache slot size, and the payload size of write operations may be a multiple of the minimum payload size up to predefined maximum size. In such embodiments, for a write operation having a payload size (e.g., 32 KB) less than the cache slot size (e.g., 128 KB), the remaining portion of the cache slot (e.g., 96 KB) may be dedicated to the current write operation, but not store any write data. When the cache 570 becomes full and a next write operation is received, the data from a least recently used cache slot may be evicted (e.g., the write data removed from the cache slot) according to LRU processing, and the cache slot used for the next write operation.

Figure 7:
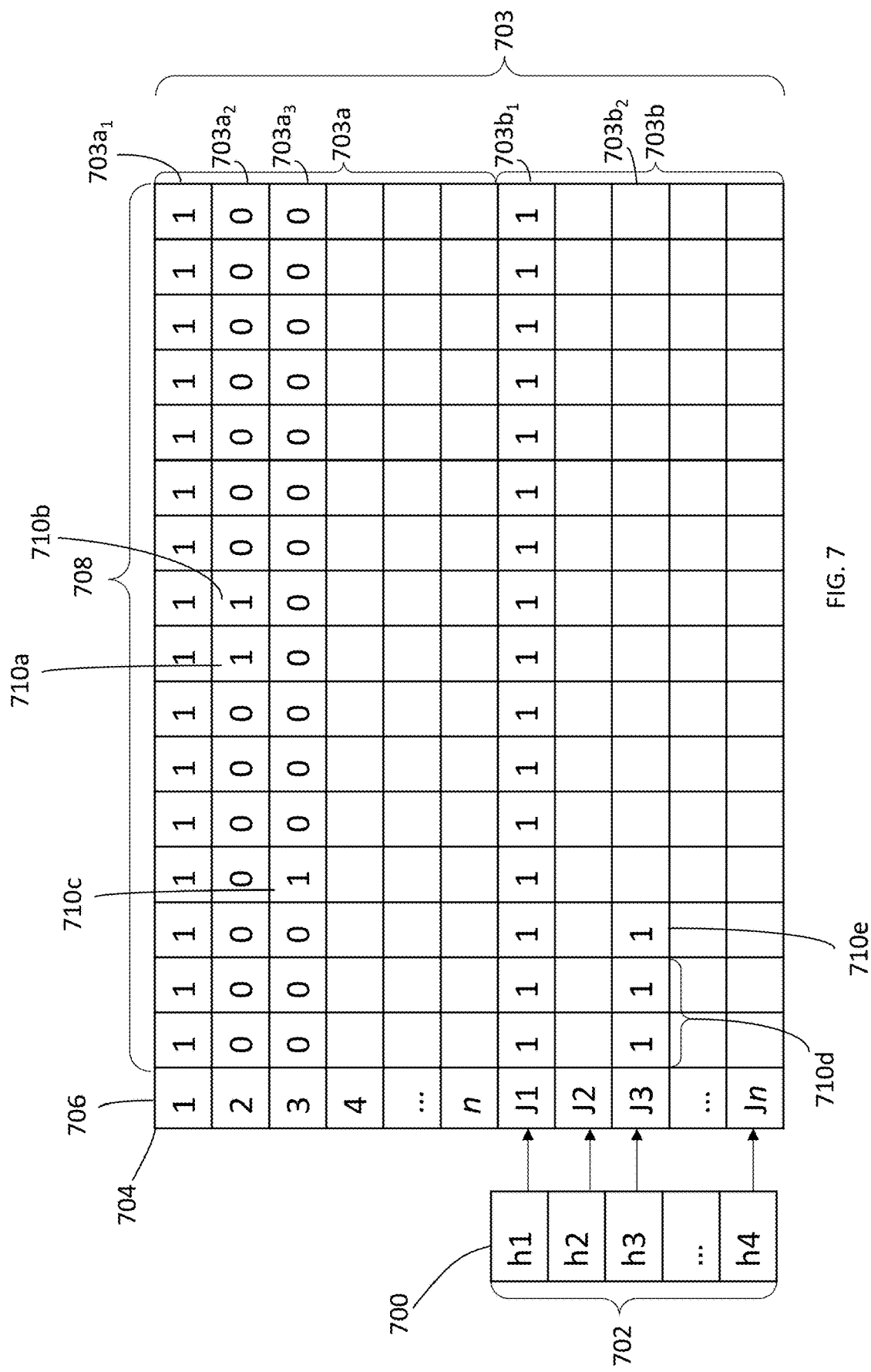
FIG. 7 is a block diagram illustrating an example of an I/O cache and hash table, according to embodiments of the invention.

In some embodiments, the cache 570 may include one or more compact journals 572, where each compact journal corresponds to a hash value produced from one or more storage device address ranges (e.g., LBA ranges), as described in more detail in relation to FIG. 7. Cache 570 may be implemented as cache 704 described in relation to FIG. 7.

FIG. 6 is a block diagram illustrating an example of a data structure 600 for mapping logical device tracks (e.g., thin device tracks) to cache slots, according to embodiments of the invention. Other embodiments of a data structure for mapping logical device tracks to cache slots, for example, variations of data structure 600, are possible and are intended to fall within the scope of the invention. Through use of information made available from any of tables 62, 72, 72' and 82 described in relation to FIGS. 3. and 4, logic device tracks can be mapped to physical device tracks; and thus, by using these data structures in combination with data structure 600, physical device tracks may be mapped to cache slots. Data structure 600 may include a plurality of entries (i.e., rows) 602, each row representing a logical device track identified by a logical device ID in column 604 and a logical device track ID (e.g., number) identified in column 606. For each entry of data structure 600, column 612 may specify a cache location in an I/O cache corresponding to the logical storage device track specified by columns 604 and 606. Data structure 600 will now be described in more detail in conjunction with I/O cache 704 and hash table 702 of FIG. 7.

FIG. 7 is a block diagram illustrating an example of an I/O cache 704 and hash table 700, according to embodiments of the invention. Other embodiments of an I/O cache and hash table, for example, variations of data structures 700 and 704, are possible and are intended to fall within the scope of the invention. Hash table 700 may be implemented as hash table 584 described in relation to FIG. 5. Cache 704 may include a plurality of cache slots 703 of a uniform size (e.g., 128 KB). In some embodiments, some of the cache slots 703b may be used for compact journals, while the remainder 703a may be used for normal caching. It should be appreciated that, in some embodiments, journal entries are not the size of a cache slot, but may occupy less than or more than a full cache slot. In some embodiments of the invention, compact journals may not be stored as part of a cache, but in a separate location.

In the embodiment of FIG. 7, each cache slot 703 includes 16 sections 708 of uniform size (e.g., 8 KB). It should be appreciated that cache slot sizes and section sizes other than 128 KB and 8 KB, and a number of sections other than 16, may be used. Each cache slot 703 may be identified by a cache slot ID specified in column 706. Compact journals occupying a cache slot may be identified using a specific ID format (e.g., number or naming convention) that I/O caching logic (e.g., 558) may be configured to use and recognize. In FIG. 7, for illustrative purposes, cache slots 703a reserved for normal cache processing are designated with a single numeral and cache slots 703b reserved for compact journals are designated with a "J" followed by a single numeral. However, it should be appreciated that other types and/or much larger alpha-numeric IDs may be used. Further, for illustrative purposes, sections 708 of cache slots 703 having data stored therein are designated with a "1" while sections not having data store therein are designated with "0."

Each cache slot 703b reserved for a compact journal may correspond to one of hash entries 702 of hash table 700, and each hash table entry 702 may have a pointer or other reference to a corresponding compact journal in one of cache slots 703b. When journaling is active, any write operation having an address range hashing to a hash value of an entry h1-hn in the hash table will be journaled in the corresponding journal J1-Jn of cache 704, which may be played back if a read operation specifies an address range that hashes to the corresponding hash entry.

Now referring to both FIGS. 6 and 7, entry 602d of data structure 600 specifies that data from a write operation for logical storage device 1, track 6 is currently cached in cache slot 1. As illustrated by cache slot 1 703$a_1$ in FIG. 7, the data from such write operation is 128K in length, occupying the entire cache slot 703$a_1$. Entry 602e specifies that data from a write operation for logical storage device 2, track 0 is currently cached in cache slot 2. As illustrated by cache slot 2 703a2, the data from such write operation is only 16K in length, occupying only sections 710a and 710b of the cache slot 703a2, while remaining 14 slots of 112 KB of space remain unused and unavailable for caching of other write data, and are in essence wasted space. Entry 602f specifies that data from a write operation for logical storage device 2, track 2, corresponding to physical device C, track 0 is currently cached in cache slot 3. As illustrated by cache slot 3 703a3, the data from such write operation is only 8K in length, occupying only section 710c of the cache slot 703a3, while remaining 15 slots of 120 KB of space are unused and unavailable for caching other write data, and are in essence wasted space.

Entry 602a specifies that data from a write operation for logical storage device 1, track 0 is currently journaled in cache slot J1. As illustrated by cache slot J1 703b1, the data from such write operation is 128K in length, occupying the cache slot 703b1. Entry 602b specifies that data from a write operation for logical storage device 1, track 1 is currently cached in cache slot J2. As illustrated by sections 710d of cache slot 3 703$b_2$, the journal entry for such write operation is only 16K in length, occupying only sections 710d of the cache slot 703b2. Unlike the case of cache slot 703a2, in which 14 sections of the cache slot are wasted, the remaining 14 slots of slot 3 703b2 remain available for other journal entries, for example, the journal entry 710e. Entry 602c specifies that data from a write operation for logical storage device 1, track 2 is currently cached in cache slot J2. As illustrated by section 710e of cache slot 3 703$b_2$, the journal entry for such write operation is only 8K in length, occupying only section 710e of the cache slot 703b2. Unlike the case of cache slot 703a3, in which 15 sections of the cache slot are wasted, the remaining 15 slots of slot 3 703b2 remain available for other journal entries, for example, the journal entry 710d. Thus, cache slots 703a2 and 703a3 only specify 24 KBs of data cumulatively, but consume 256 KB of memory, wasting 232 KB of space while, in contrast, journal entries 710d and 710e, also cumulatively for 24 KB of payload data, may consume only 24 KBs of space.

Figure 8:
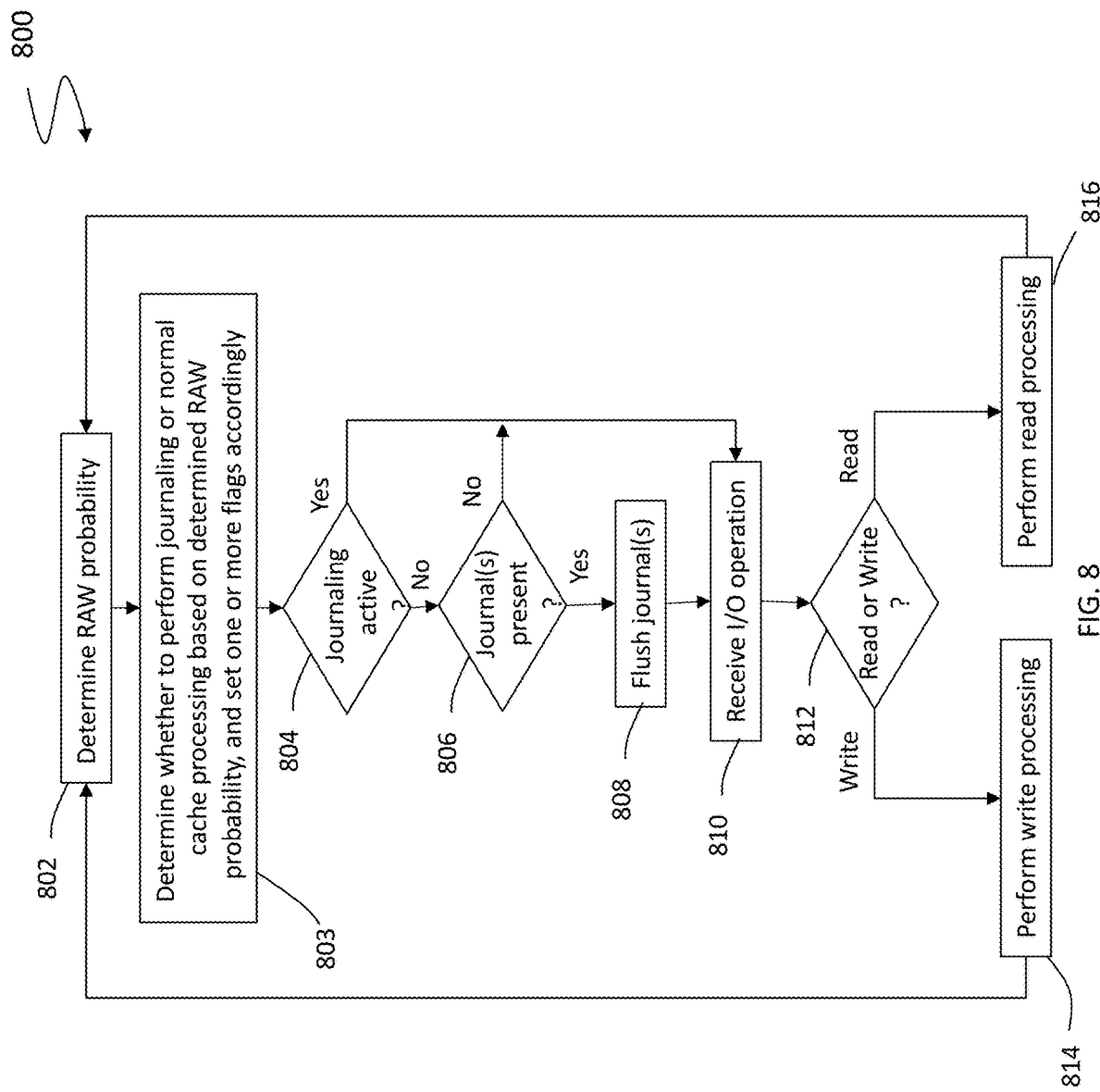
FIG. 8 is a flowchart illustrating an example of a method of processing I/O operations based at least in part on a probability of a read-after-write event, according to embodiments of the invention.

FIG. 8 is a flowchart illustrating an example of a method 800 of processing I/O operations based at least in part on a probability of a read-after-write event, according to embodiments of the invention. Other embodiments of a method 800 of processing I/O operations based at least in part on a probability of a read-after-write event, for example, variations of method 800, are possible and are intended to fall within the scope of the invention.

In step 802, a RAW probability is determined as described in more detail elsewhere herein, for example, by probability logic 556. RAW probability may be determined for an entire storage system (e.g., 500), for one or more storage devices for a storage system, or for any other physical or functional component of a storage system.

In step 803, it may be determined whether to perform journaling (e.g., using compact journals) or normal cache processing based on determined RAW probability, and one or more flags may be set accordingly. For example, the determined RAW probability may be compared to a predefined RAW threshold. If the RAW probability is greater than the RAW probability threshold, a journal active flag (e.g., 566) may be cleared or remain clear, whereas if the RAW probability is less than or equal to the RAW probability threshold, the journal active flag may be set or remain set.

In step 804, it may be determined whether journaling is active, for example, by reading a value of journal active flag 566. If journaling is active, method 800 may proceed to step 810. Even though journaling may not be active, there still may be entries in the journal from when it was active. Thus, if it is determined in step 804 that journaling is not active, then in step 806 it may be determined whether one or more journals are present, for example, by reading a value of the journal present flag 576. If one or more journals are not present, method 800 may proceed to step 810. Otherwise, in step 808, the one or more journals may be de-staged (i.e., flushed) to disk. That is, each journal may be traversed, entry-by-entry (e.g., in first-in-first-out (FIFO) order) and each write operation defined by a journal entry committed to disk. In some embodiments, one or more journals are not de-staged when compact journaling is de-activated, but rather are not de-staged until the cache is de-staged after such de-activation.

It step 810, an I/O operation may be received, and in step 812 it may be determined whether it is a read or write operation. If it is a read operation, step 814 of performing write processing may be performed, whereas, if it is a write operation, step 816 of performing a read processing may be performed. After performance of either step 814 or 816, method 800 may return to step 802.

It should be appreciated that the order of performance of the steps of method 800 are not limited to the order illustrated in FIG. 8, and that some steps or portions thereof may be performed in parallel with other steps or portions thereof. For example, any of steps 802 and 803 may be performed independently of, and concurrently to, steps 804-816, and method 800 may return to step 810 after performance of either of steps 814 and 816.

Figure 9:
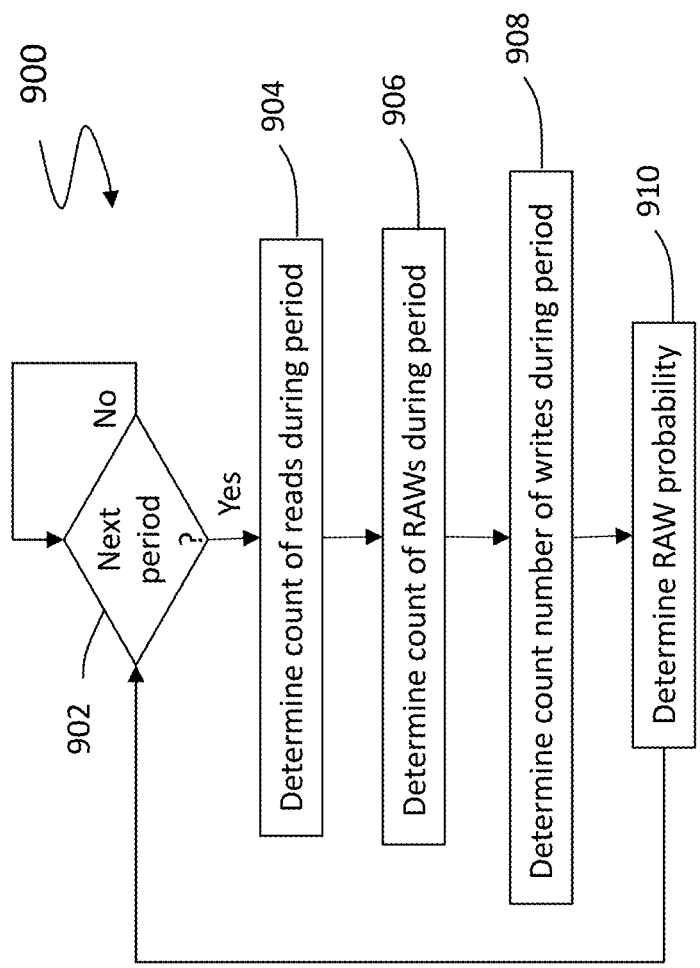
FIG. 9 is a flowchart illustrating an example of a determining a probability of a read-after-write event, according to embodiments of the invention.

FIG. 9 is a flowchart illustrating an example of a method 900 of determining a RAW probability, according to embodiments of the invention. Other embodiments of a method of determining a RAW probability, for example, variations of method 900, are possible and are intended to fall within the scope of the invention.

In step 902 it may be determined whether there is a next sampling period (e.g., temporal interval) of I/O data from which to determine RAW probability. Step 902 may be repeated until a next period of I/O data is available, which may result in method 900 proceeding to step 904. In addition, or as an alternative, to repeated performance of step 902, step 904 may be performed as a result of an event, for example, receiving user input or a communication that a next period of I/O data is available. A sampling period may have any of a variety of lengths. In some embodiments, it may be desirable to have the length of a sampling period be configured to be the less than a typical fall-through time of a cache—i.e., a typical duration a write data remains in cache before being evicted, e.g., according to an LRU process.

In step 904, a total number of read operations received during the period may be determined. For example, I/O operations during the period may have been traced and the number of read operations tallied. In step 906, a number of RAWs during the period may be determined. For example, I/O operations during the period may have been traced. Each time a read operation was received, it may have been determined whether the data specified by the read operation was still in cache (e.g., in a normal cache slot or a compact journal in accordance with embodiments of the invention), and if so, a RAW count increased by one. In step 908, a number of write operations during the period may be determined. For example, I/O operations during the period may have been traced and the number of read operations tallied.

In step 910, a RAW probability may be determined. In some embodiments, a RAW probability may be determined based, at least in part, using Bayesian inference, for example, in accordance with Equation 1.

$$P(RAW|I/O \text{ is a Read})=(P(I/O \text{ Is a Read}|RAW)*P(RAW))/P(I/O \text{ is a Read}) \quad \text{Equation 1}$$

where:
P(RAW|I/O is a Read)=the probability of a RAW occurring given that an I/O operation is a read operation;

P(I/O is a Read|RAW)=the probability of a read operation occurring given that an I/O operation is a RAW;
P(RAW)=the probability of a RAW; and
P(I/O is a Read)=the probability that an I/O is a read operation.

Because the probability of a read occurring given that an I/O is a RAW is 100% (i.e., all RAWs are a read operation), P(I/O Is a Read|RAW) is 100%, and Equation 1 can be simplified to Equation 2.

$$P(RAW|I/O \text{ is a Read})=(1*P(RAW))/P(I/O \text{ is a Read}) \quad \text{Equation 2}$$

FIG. 10 is a table 1000 illustrating examples of determined RAW probabilities based on read, write and read-after-write counts, according to embodiments of the invention. Table 1000 includes a plurality of entries 1002, each entry representing a period of time, for example, consecutive 60-second intervals. Although not shown in table 1000, table 1000 assumes a maximum potential number of I/O operations for each period of 100,000. Each entry 1002 may specify: a period in column 1010, a read count for the period in column 1012, a read exponential moving average (EMA) following the period in column 1014, a write count for the period in column 1016, a write EMA following the period in column 1018, a RAW count for the period in column 1020, a RAW EMA following the period in column 1022, a probability of receiving any I/O operation in column 1024, a probability that an I/O operation will be a read (P(I/O is a Read)) in column 1026, a probability of an I/O operation being a RAW (P(I/O is a Read)) in column 1028, and the probability of a RAW given that an I/O operation is a read (i.e., P(RAW|I/O is a RAW)) in column 1030.

In some embodiments of the invention, exponential smoothing is used to give greater weight to more recent I/O events in determining a RAW probability, in which exponential moving averages (EMA) are determined for events using an exponential smoothing factor. An EMA for a series of data can be expresses as Equations 3a and 3b.

$$E_0 = x_0 \quad \text{Equation 3a}$$

$$E_t = \alpha x_t + (1-\alpha) E_{t-1} \quad \text{Equation 3b}$$

where:
$E_t$=the EMA of data x at time t (e.g., calculated for this period)
$E_{t-1}$=the EMA of data$_x$ at time$_{t-1}$ (e.g., calculated for the immediately preceding this period
$x_0$ is the initial value of the data
$E_0$=an the initial EMA of the data; and
$\alpha$=the smoothing factor, having a value between 0 and 1

The value of the smoothing factor may be selected based on the desired memory of the exponential smoothing function; i.e., the desired extent to which past data affects current data. The greater the smoothing factor, the less the past will impact a current determined value, and vice versa. In some embodiments, the value of the smoothing factor may be based, at least in part on an expected fall-though time of the cache and/or the length or the sampling period. In the embodiment illustrated by table 1000, a smoothing factor $\alpha=0.125$ is used, but it should be appreciated that other smoothing factors may be used. Thus, in table 1000, read EMA, write EMA and RAW EMA may be determined for a period, t, by Equations 4, 5 and 6, respectively:

$$E_t(\text{read})=0.125*\text{read\_count}_t+0.875*E_{t-1}(\text{read}) \quad \text{Equation 4}$$

$$E_t(\text{write})=0.125*\text{write\_count}_t+0.875*E_{t-1}(\text{write}) \quad \text{Equation 5}$$

$$E_t(\text{RAW})=0.125*\text{RAW\_count}_t+0.875*E_{t-1}(\text{RAW}) \quad \text{Equation 6}$$

In the embodiment illustrated by table 1000, the probability of receiving any I/O operation following a period, t (column 1024) may be determined by Equation 7

$$P(I/O) = (E_t(\text{read}) + E_t(\text{write}))/(\text{a maximum} \quad \text{Equation 7}$$
$$\text{potential number of I/O ops for } t)$$
$$= (E_t(\text{read}) + E_t(\text{write}))/100{,}000$$

In the embodiment illustrated by table 1000, the probability that an I/O operation will be a read operation following a period, t (i.e., P(I/O is a Read) may be determined by Equation 8:

$$P(I/O \text{ is a read}) = E_t(\text{read})/(E_t(\text{read}) + E_t(\text{write})) \quad \text{Equation 8}$$

In the embodiment illustrated by table 1000, the probability that an I/O operation will be a RAW following a period t may be determined by Equation 9:

$$P(RAW) = E_t(\text{RAW})/(\text{a maximum potential} \quad \text{Equation 9}$$
$$\text{number of I/O ops for } t)$$
$$= E_t(\text{RAW})/100{,}000$$

In the embodiment illustrated by table 1000, the probability of a RAW given that an I/O operation is a read (i.e., P(RAW|I/O is a Read)) following a period t may be determined by Equation 10:

$$P(RAW|I/O \text{ is a Read}) = E_t(\text{RAW})/P(I/O \text{ is a read}) \quad \text{Equation 10}$$

That is, Equation 10 may define a RAW probability in some embodiments of the invention.

In the embodiment of table 1000, an initial condition is set that all reads are RAW, as reflected by the read count and RAW count being the same value (2,793) in columns 1012 and 1020 of entry 1003. Such initial conditions may be considered to assume a worst-case scenario by default.

In the embodiment of table 1000, a RAW threshold may be set to 5% such that if RAW probability is greater than 5%, compact journaling is de-activated or left de-activated, and if a RAW probability is less than or equal to 5%, compact journaling may be activated or left active. For example, in table 1000, compact journaling may be de-activated (of left de-activated if initialized to de-activated) after period 1 (entry 1003), and left de-activated through period 10, as the RAW probabilities calculated in column 1030 are all greater than 5%. After period 11 (entry 1004), compact journaling may be activated because the RAW probability calculated in column 1030 (4.82%) is less than 5%, and may stay activated through period 19 as the RAW probabilities remain below or equal to 5%.

In period 20 (entry 1006), a spike in reads ("55,137" in column 1012) and writes ("44,444" in column 1020) is experienced, causing the RAW probability (column 1030) to shoot up to 14.34%, which would result in compact journaling being de-activated again through period 32. After period 33 (entry 1008) compact journaling may be activated again on as the RAW probability drops below 5% again. The values of RAW probabilities for periods 20-34 illustrate the smoothing effect of exponential smoothing, as the effect of the spike in reads and RAWs in period 20 is slowly dampened over the next several periods.

It should be appreciated that a RAW probability may be determined in any of a variety of other ways, including performing different mathematically calculations on the read, write and RAW counts that collectively produce a same mathematically result.

Figure 11:
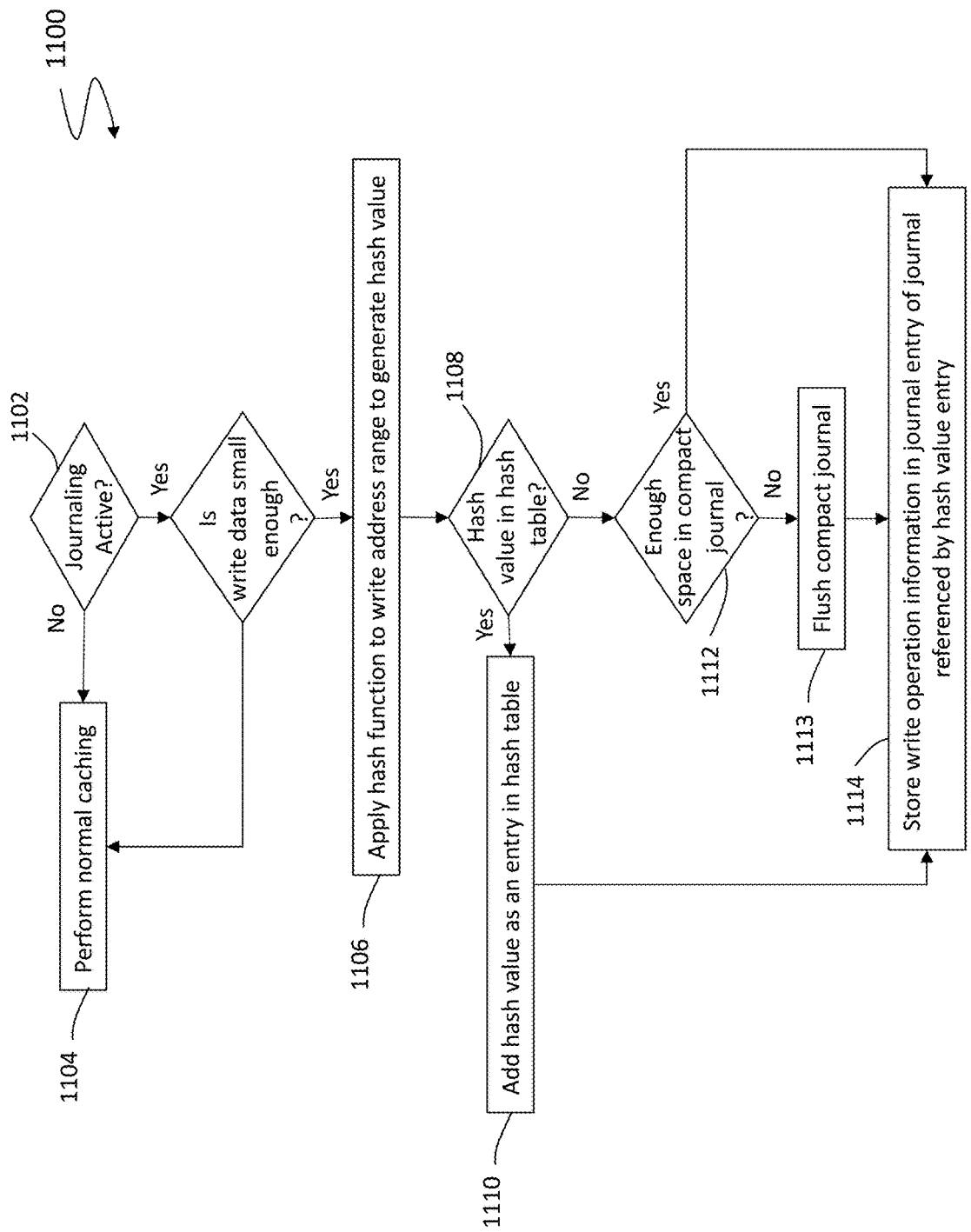
FIG. 11 is a flowchart illustrating an example of a method of processing a write operation based at least in part on a probability of a read-after-write event, according to embodiments of the invention.

FIG. 11 is a flowchart illustrating an example of a method 1100 of processing a write operation based at least in part on a RAW probability, according to embodiments of the invention. Other embodiments of a method of processing a write operation based at least in part on a RAW probability, for example, variations of method 1100, are possible and are intended to fall within the scope of the invention.

In step 1102, it may be determined whether journaling is active, for example, by reading the value of flag 566. If it is determined that journaling is not active, then normal caching may be performed in step 1104, for example, producing the contents of one of cache slots 703*a*. As described elsewhere herein, using compact journals may provide a benefit of reducing cache space consumption for I/O writes if the size of the write data is less than a cache slot size. However, a potential drawback of using compact journals is the resource consumption in playing back a compact journal on a read hit. Thus, in some embodiments, it may be determined whether the size of the write data is small enough; i.e., it may be determined, based on the RAW probability and perhaps other empirical data, if the difference in size between the write data and cache slot size is great enough so that, on balance, the benefits of compact journaling outweighs the potential performance hit of playing back a compact journal on a read hit. For example, write caching logic 560 may include logic (e.g., caching rules) for making this determination. For example, if a cache slot size of cache 570 is 128 KB, caching logic may be configured to only perform compact journaling if a write size is less than 64 KB, or the write size threshold may vary depending on the current RAW probability and/or other factors.

If it is determined that the write data is not small enough, method 1100 may proceed to step 1104; otherwise method 1100 may proceed to step 1106. In step 1106, a hash function may be applied to the address range specified by the write operation to produce a hash value, and it may be determined in step 1108 whether the hash value is already an entry in the hash table (e.g., hash table 584 and/or 700). If the hash value is not already an entry in hash table 1108, then, in step 1110, the hash value may be added as entry to the hash table.

In step 1108, if it is determined that the hash value is already an entry in the hash table, then, in step 1112, it may be determined whether there is enough space in the compact journal corresponding to (and linked-to or otherwise referenced by) the hash entry for the data of the I/O operation. For example, a write operation may have a write payload of 64 KB, but there may only be 40 KB of reserved space left in the compact journal. If it is determined that there is not enough room in the compact journal for the write payload, then the compact journal may be flushed to disk. That is, the compact journal may be traversed, entry-by-entry (e.g., in first-in-first-out (FIFO) order) and each write operation defined by a journal entry committed to disk.

If it is determined that there is enough space in the compact journal for the write payload, or after the compact journal is flushed, method 1100 may proceed to step 1114. In step 1114, the write operation may be stored as a journal entry in the compact journal corresponding to (and linked-to or otherwise referenced by) the hash entry of the determined hash value. Performance of steps 1106-1114 may produce the contents of any of cache slots 703*b*.

Figure 12:
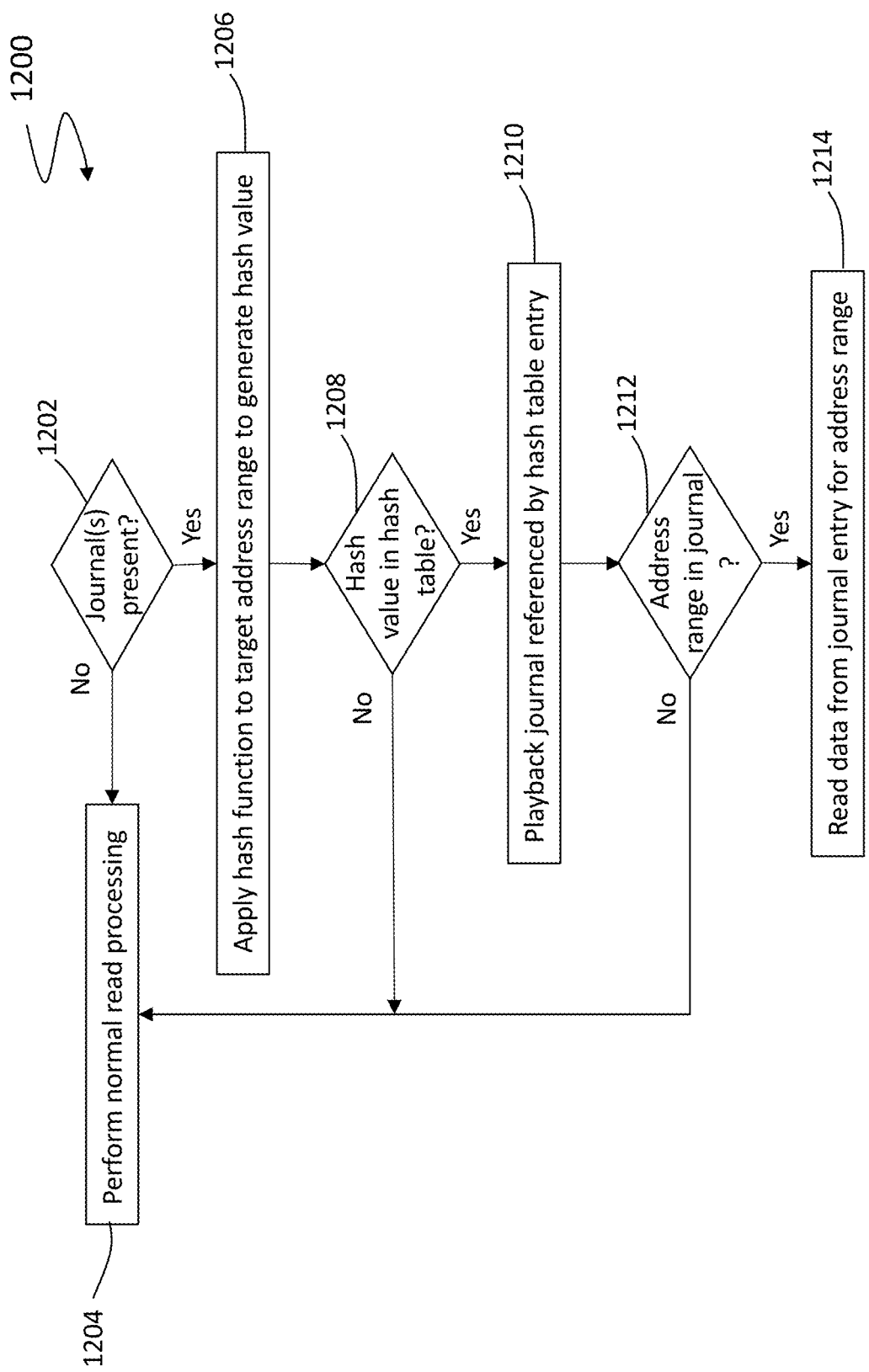
FIG. 12 is a flowchart illustrating an example of a method of processing a read operation based at least in part on a probability of a read-after-write event, according to embodiments of the invention.

FIG. 12 is a flowchart illustrating an example of a method 1200 of processing a read operation based at least in part on a RAW probability, according to embodiments of the invention. Other embodiments of a method of processing a read operation based at least in part on a RAW probability, for example, variations of method 1200, are possible and are intended to fall within the scope of the invention.

In step 1202, it may be determined whether one or more compact journals are present, for example, by reading the value of flag 568. If it is determined that no compact journals are present, then normal read processing may be performed in step 1204, which may include, for example, determining if the data is present in a cache slot and, if so, reading the data therefrom, or otherwise reading from disk (i.e., from a physical storage device). If it is determined that one or more journals are present in step 1202, then in step 1206 a hash function may be applied to the address range specified by the read operation to produce a hash value, and it may be determined in step 1108 whether the hash value is present in the hash table (e.g., hash table 584 and/or 700).

In some embodiments: if the hash value is not present in hash table 1208, then it is concluded that the data specified by the read operation is not currently journaled, and the method proceed to step 1204; and if the hash value is present in the hash table, it is determined that the data specified by the read operation may be in a compact journal. If the hash value is in the hash table, then in step 1120, the compact journal (e.g., the contents of any of cache blocks 703*b*) corresponding to the hash entry may be played back to determine conclusively whether the read data is present in the compact journal. It may be determined in step 1212 whether the read data is in the compact journal, for example by determining whether any of the compact journal entries contain the address range of the read operation. For example, a physical device ID, starting LBA and LBA length of the read operation may be compared, in turn, to the physical device ID, starting LBA and LBA length of each compact journal entry. If it is determined in step 1212 that the address range of the read operation is not within the address range of any compact journal entry, then method 1200 may proceed to step 1204. Otherwise, if in step 1214 it is determined that one or more entries of the compact journal specify address ranges that contain the address range of the read operation, in step 1214 data may be read from the last (i.e., most recent) compact journal entry of the one or more entries. A compact journal having more than one entry for an address range may result from multiple write operations specifying a same address range between flushes of the compact journal to disk. In such cases, the data from the most recent compact journal entry should be read.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 800, 900, 1100 and 1200, or parts thereof, may be implemented using one or more of the systems and/or data structures described in relation to FIGS. 1-7 and 10, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of managing an input/output (I/O) cache on a storage system, comprising:
for at least a first storage device of the storage system, determining a probability that a read operation for a portion of data will be received while the portion of data resides in the I/O cache as a result of a write operation for the portion of data;
receiving a write request for the at least first storage device, the write request specifying a write operation for a first portion of data and an address range within the at least first storage device; and
determining based at least in part on the probability whether to: to record a journal entry for the first portion of data in a journal, or write to the I/O cache as part of writing in place.

2. The method of claim 1, wherein determining the probability includes applying exponential smoothing to historical read and write information so that more recent historical read and write information has greater weight in determining the probability.

3. The method of claim 1, wherein determining based at least in part on the probability includes:
comparing the probability to a predefined probability threshold;
if the probability is less than or equal to the predefined probability threshold, determining to record the journal entry; and
if the probability is greater than the predefined probability threshold, determining to perform the write to the I/O cache as part of writing in place.

4. The method of claim 1, further comprising:
if it is determined to record the journal entry, applying a hash function to the address range to produce a hash value,
wherein the journal corresponds to the hash value.

5. The method of claim 4, further comprising:
storing the hash value in an entry of a hash table, the entry specifying a reference to the journal.

6. The method of claim 1, wherein the storage system includes one or more journals, the method further comprising:
receiving a read request specifying a read operation for an address range of a storage device; and
determining that either: there is not a journal entry for the address range of the storage device in the one or more journals or there may be a journal entry for the address range of the storage device in a first of the one or more journals.

7. The method of claim 6, further comprising:
if it determined that there may be a journal entry in the first journal for the address range of the storage device, playing back the first journal to determine if there is a journal entry.

8. A storage system comprising:
an I/O cache;
at least a first storage device;
one or more processors; and
memory comprising code stored thereon that, when executed, performs a method of managing the I/O cache comprising:
for the at least first storage device, determining a probability that a read operation for a portion of data will be received while the portion of data resides in the I/O cache as a result of a write operation for the portion of data;
receiving a write request for the at least first storage device, the write request specifying a write operation for a first portion of data and an address range within the at least first storage device; and
determining based at least in part on the probability whether to: to record a journal entry for the first portion of data in a journal, or write to the I/O cache as part of writing in place.

9. The system of claim 8, wherein determining the probability includes applying exponential smoothing to historical read and write information so that more recent historical read and write information has greater weight in determining the probability.

10. The system of claim 8, wherein determining based at least in part on the probability includes:
comparing the probability to a predefined probability threshold;
if the probability is less than or equal to the predefined probability threshold, determining to record the journal entry; and
if the probability is greater than the predefined probability threshold, determining to perform the write to the I/O cache as part of writing in place.

11. The system of claim 8, the method further comprising:
if it is determined to record the journal entry, applying a hash function to the address range to produce a hash value,
wherein the journal corresponds to the hash value.

12. The system of claim 11, the method further comprising:
storing the hash value in an entry of a hash table, the entry specifying a reference to the journal.

13. The system of claim 8, wherein the storage system includes one or more journals, the method further comprising:
receiving a read request specifying a read operation for an address range of a storage device; and
determining that either: there is not a journal entry for the address range of the storage device in the one or more journals; or there may be a journal entry for the address range of the storage device in a first of the one or more journals.

14. The system of claim 13, the method further comprising:
if it determined that there may be a journal entry in the first journal for the address range of the storage device, playing back the first journal to determine if there is a journal entry.

15. One or more non-transitory computer-readable media, the computer-readable media having software stored thereon for managing an I/O cache of a storage system, the software comprising:
executable code that determines, for at least a first storage device of the storage system, a probability that a read operation for a portion of data will be received while the portion of data resides in the I/O cache as a result of a write operation for the portion of data;
executable code that receives a write request for the at least first storage device, the write request specifying a write operation for a first portion of data and an address range within the at least first storage device; and
executable code that determines based at least in part on the probability whether to: to record a journal entry for the first portion of data in a journal, or write to the I/O cache as part of writing in place.

16. The one or more non-transitory computer-readable media of claim 15, wherein the executable code that determines the probability includes executable code that applies exponential smoothing to historical read and write information so that more recent historical read and write information has greater weight in determining the probability.

17. The one or more non-transitory computer-readable media of claim 15, wherein the executable code that determines based at least in part on the probability includes:
executable code that compares the probability to a predefined probability threshold;
executable code that determines, if the probability is less than or equal to the predefined probability threshold, to record the journal entry; and
executable code that determines, if the probability is greater than the predefined probability threshold, to perform the to the I/O cache as part of writing in place.

18. The one or more non-transitory computer-readable media of claim 15, the software further comprising:
executable code that applies, if it is determined to record the journal entry, a hash function to the address range to produce a hash value,
wherein the journal corresponds to the hash value.

19. The one or more non-transitory computer-readable media of claim 18, the software further comprising:
executable code that stores the hash value in an entry of a hash table, the entry specifying a reference to the journal.

20. The one or more non-transitory computer-readable media of claim 15, wherein the storage system includes one or more journals, the software further comprising:
executable code that receives a read request specifying a read operation for an address range of a storage device; and
executable code that determines that either: there is not a journal entry for the address range of the storage device in the one or more journals; or there may be a journal entry for the address range of the storage device in a first of the one or more journals.

\* \* \* \* \*